United States Patent [19]

Faller et al.

[11] Patent Number: 4,665,369
[45] Date of Patent: May 12, 1987

[54] DEVICE INCLUDING PLURAL WIRE DETECTING COILS HAVING FAULTY COIL SENSING CAPABILITIES FOR THE DIRECTIONAL GUIDANCE OF THE TRACKLESS VEHICLE

[75] Inventors: Rainer Faller; Friedrich Landstorfer, both of Munich, Fed. Rep. of Germany

[73] Assignee: M.A.N. Maschinenfabrik Augsburg-Nurnberg Aktiengesellschaft, Munich, Fed. Rep. of Germany

[21] Appl. No.: 653,954

[22] Filed: Sep. 21, 1984

[30] Foreign Application Priority Data

Sep. 23, 1983 [DE] Fed. Rep. of Germany ....... 3334548

[51] Int. Cl.⁴ .................. B62D 1/24; G01V 3/165; H01F 27/28; G01B 7/14
[52] U.S. Cl. .................... 324/326; 180/168; 318/587; 324/208; 336/186
[58] Field of Search .............. 324/67, 207, 208, 243, 324/326; 180/167, 168; 318/580, 564, 587; 336/180, 186; 340/508, 941; 339/104

[56] References Cited

U.S. PATENT DOCUMENTS

| 1,287,251 | 12/1918 | Darley | 324/67 |
| 2,692,372 | 10/1954 | Goldstine | 336/186 X |
| 4,258,813 | 3/1981 | Rubel | 180/168 |
| 4,318,093 | 3/1982 | Wood et al. | 340/508 X |
| 4,350,954 | 9/1982 | Seilly | 324/236 X |
| 4,392,693 | 7/1983 | Habermann et al. | 324/208 X |
| 4,402,903 | 9/1983 | Lenderking | 340/508 |

Primary Examiner—Gerard R. Strecker
Attorney, Agent, or Firm—Scully, Scott, Murphy & Presser

[57] ABSTRACT

Method and device for measuring two orthogonal electromagnetic field components using a cross coil and for evaluating the components in the distance measurement in electronically course-steered vehicles (13). For rapid and ensured detection of malfunctions of the distance measuring system, use is made of an antenna effecting concurrent positionally and timewise measurements, and with the coils each consisting of bifilar or trifilar coil wires representing a redundant measuring system. A monitoring unit is used to continuously compare the signals generated by the various wires of the antenna when scanning the magnetic field. When a malfunction occurs in one of the channels, vehicle steering control is continued by the respective other channel and the defect is indicated via the monitoring unit. As monitoring signals, use can also be made of direct currents superimposed in the coils.

4 Claims, 3 Drawing Figures

DEVICE INCLUDING PLURAL WIRE DETECTING COILS HAVING FAULTY COIL SENSING CAPABILITIES FOR THE DIRECTIONAL GUIDANCE OF THE TRACKLESS VEHICLE

BACKGROUND OF THE INVENTION

1. Field of the Invention

The present invention relates to a method and to a device for the measurement of two orthogonal electromagnetic field components on the basis of a cross coil, and for evaluating the components during the distance measurement in electronically guided vehicles.

2. Discussion of the Prior Art

An arrangement of that type is disclosed in German Pat. No. 30 15 954, in which an antenna constructed as a cross coil serves to two-dimensionally scan the magnetic field of a pilot cable which is positioned in the roadway. The antenna signals are finally correspondingly processed in order to provide for the steering of the vehicle. For vehicles which are steered in this manner, an adequate monitoring must be provided to ensure that the vehicle will not be endangered in the event of the failure of a system component of the vehicle. In the above-disclosed known arrangement there is provided a diagnostic field having a predetermined amplitude and frequency is superimposed on the pilot cable field, through which there is generated a test signal for the monitoring of the antenna arrangement. In this manner there is indicated any malfunction in the steering control system, so as to enable the driver to undertake appropriate measures, when in the use of this known arrangement there is encountered a failure of the receiving antenna the steering control will be spontaneously interrupted.

SUMMARY OF THE INVENTION

According, it is a basic object of the present invention to provide a method for the secure guidance of a vehicle which enables the continuance of the steering control in the event of any failure of the receiving antenna.

It is a more specific object of the present invention to provide a method of the type described in which there are provided at least two mutually independent, and within the limits of error non-interfering, measurements of the respective orthogonal field component, simultaneously with regard to position and time.

Through the redundant measurement of the field components there is afforded a continual operation of the steering control in the event of the failure of one of the measuring systems. The measurement due to signals, being simultaneous in position and time, can be utilized concurrently for a monitoring device, which indicates an error in the event one fails during the use of two measuring systems; in effect, discloses and locates an error when there is utilized a three-channel or higher channel system. The method of the present invention thus renders possible a dynamically continual monitoring and rapid error indication. For this purpose, no additional magnetic field is required for diagnostic purposes, such as in the present state of the technology.

The present invention also provides a device for implementing the inventive method, which includes an antenna consisting of at least one core having at least two coils would thereabout, and in which the coils are each constituted of at least two parallel-wound, mutually electrically-insulated coil wires.

The antenna pursuant to the present invention affords the advantage that, with the utilization of extremely simple manufacturing techniques, there can be concurrently delivered a plurality of field measurements of the same location which, on the one hand, during a change in the service channel, ensure a steady and not a jerky continuation of the steering action, and also, on the other hand, enable a dynamic continual monitoring through a simple comparison of the measurement signals.

In order to ensure the continuation of the vehicle driving operation up to at least parking of the vehicle upon disruption in one channel, there can be provided a simple two-channel system with bifilar coils, so as to render possible an indication of the malfunction. The antenna is preferably equipped with trifilar coils which, as a result, additionally enable a rapid and reliable recognition of the disrupted channel.

In order to achieve a reduction in the short-circuit current in the event of winding or layer contact, utilization can be made of a resistance wire in the coil, such that a reactive effect on other channels of the same coil can be brought to an acceptable minimum.

When there is possibly encountered the danger of a short-circuit, for example, by the rubbing together of wires belonging to different channels, then pursuant to another feature of the present invention, direct currents can be superimposed on the currents which are induced in the coil wires by the magnetic field of the pilot cable. In this manner, on the basis of a changed direct current flow, there can be recognized and signaled the presence of short-circuits occurring between individual wires of a multifilar coil construction, which exert no influence over the voltage induced by the magnetic field at the coil pick-off points.

Pursuant to a further feature of the present invention, a common single core is associated with the coils, which is sufficiently large to allow distance measurements to be effected at 30 times the pilot or guide cable field variations. Achieved thereby is a high sensitivity for the receiving antennas, which deliver high level signals and, as a result, a good measurement is obtained even when the guide cable currents fluctuate extensively, or drop off considerably, for example, as in the case of cable breakages.

An advantageous embodiment of the present invention resides in an E-shaped configuration of the iron core, in which the legs thereof are wound about by the coils.

BRIEF DESCRIPTION OF THE DRAWINGS

Reference may now be had to the following description of preferred embodiments of the invention, taken in conjunction with the accompanying drawings; in which.

DETAILED DESCRIPTION

Figure 1:
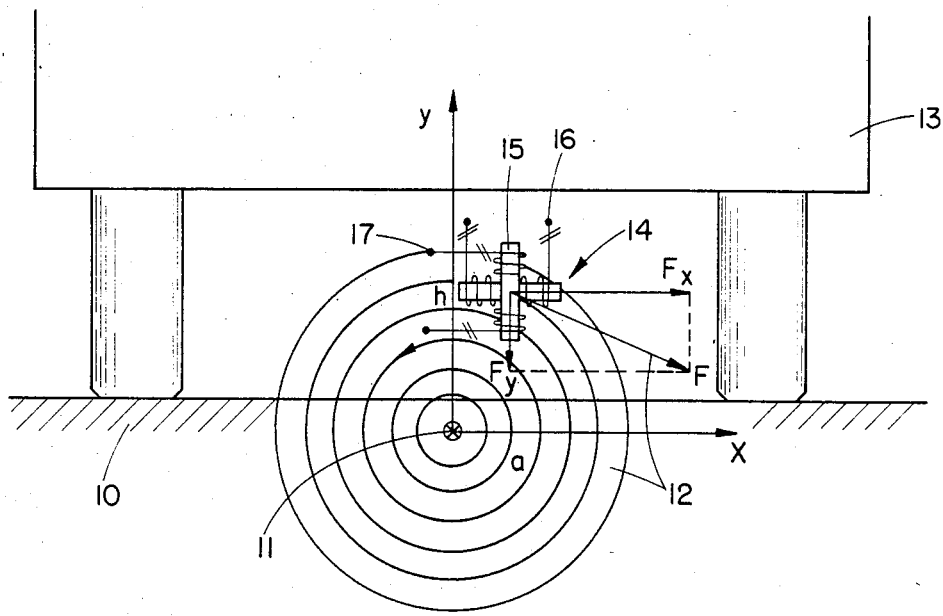
FIGS. 1 and 2 each illustrate respectively an embodiment of the invention.

Referring to FIG. 1 of the drawings, an AC pilot or guide cable 11, which is arranged in a roadway 10, has the magnetic field 12 thereof scanned by a receiving antenna 14 for the automatic steering of a vehicle 13. The antenna 14 consists of a cross-shaped iron core 15, the legs of which are respectively wound about by bifilar coils 16 and 17.

The antenna 14 is arranged such that one branch of the iron core 15 together with the coil 16 is positioned horizontally for detecting the horizontal field components $F_x$. The second, vertically arranged branch with the coil 17 is provided for the vertical field components $F_y$. Through this arrangement of the coils, inferences can be drawn, by measuring the induction voltages through the field components $F_y$ and $F_x$ on the basis of the relationship $$F_x/F_y = (h/a) \qquad (1)$$

with regard to the positioning of the antenna 14 within the magnetic field 12, or the lateral distance "a", calculated from the Equation (1)

$$a = h(F_y/F_x)$$

when there is known the height "h" between the guide cable 11 and the antenna 14.

The signals which are delivered by the coils 16 and 17 are processed in accordance with known methods (for instance, as in DE-OS No. 30 15 954), and are conducted to a steering installation in order to guide the vehicle along the pilot or guide cable 11.

Due to the bifilar coil winding, two signals are presently generated for each coordinate of which, depending upon the processing system, one or both are presently employed for the formation of a steering signal. In the event of one signal failing, there is employed the second pair of signals.

The four antenna signals are additionally conducted to a known monitoring unit (for instance, as in DE-PS No. 12 72 834), which is not illustrated in the drawing, and which in the event of malfunction, for example, a break in the coil wire, will report the malfunction to the driver through an acoustic and/or optical signal, while the second signal will provide for continuation of the secure steering of the vehicle.

Inasmuch as the two coil wires of the respective coil 16 or 17 are positionally equally arranged, they will generate signals at the same time on the basis of the same field point, so that in the event of malfunction in a channel of the antenna 14, the steering control can be continually further effected by means of the second channel without causing any jerky steering maneuver. Moreover, through the equality in both the position and time of the measurements, it is also possible to achieve an extremely rapid and assured detection of the malfunction.

The configurations for the coils as well as for the iron core are not limited to that illustrated in FIG. 1. Within the framework of safety measures through redundant measuring systems, coils can be employed with three or more wires, which are wound onto the core jointly or separated from each other. The iron core can optionally be constructed from one or multiple components while maintaining a basic, orthogonal pattern.

Figure 2:
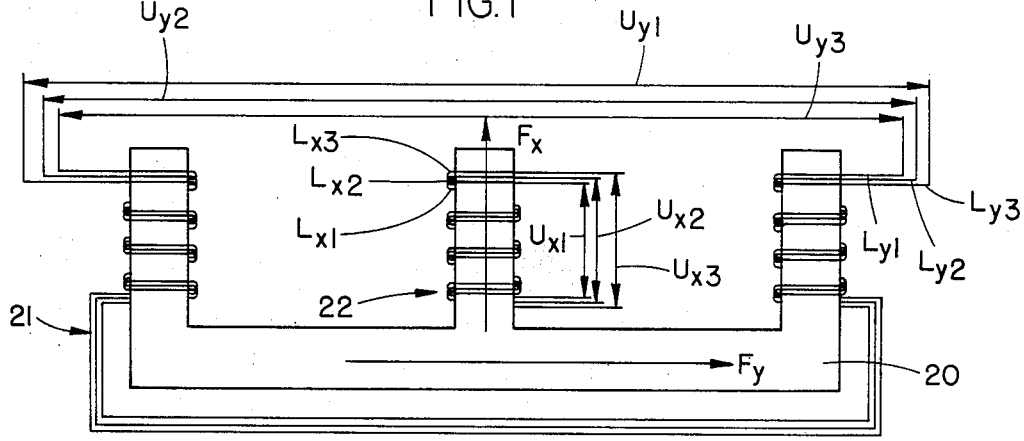

Illustrated in FIG. 2 is an embodiment incorporating an E-shaped iron core 20, the outer legs of which are wound about by a first coil 21 for the $F_y$ field components, and the inner leg of which is wound about by a second coil 22 for the $F_x$ field components. In this case, the coils 21 and 22 each consist of three wires $L_{y1}$, $L_{y2}$, $L_{y3}$ or $L_{x1}$, $L_{x2}$, and $L_{x3}$ at the ends of which, due to field induction, there are present the voltages $$U_{y1} = U_{y2} = U_{y3} \text{ and}$$

$$U_{x1} = U_{x2} = U_{x3}.$$

As a result, the two coils 21 and 22 form a three-channel control system in which there is not only detected a malfunction through a comparison of two of three channels, but also of the particular channels in which there is encountered the malfunction.

The E-shaped iron core adapted for particularly large iron cores, which is desired for sensitive measurements at extensively fluctuating guide cable currents, and thereby more intense changes in the magnetic field. The antenna can be directly monitored, as described hereinbefore, on the basis of the coil signals. For detection of cross-channel errors, further current sources are superimposed on the coils, and the superimposed current flow is used as a monitoring signal.

Figure 3:
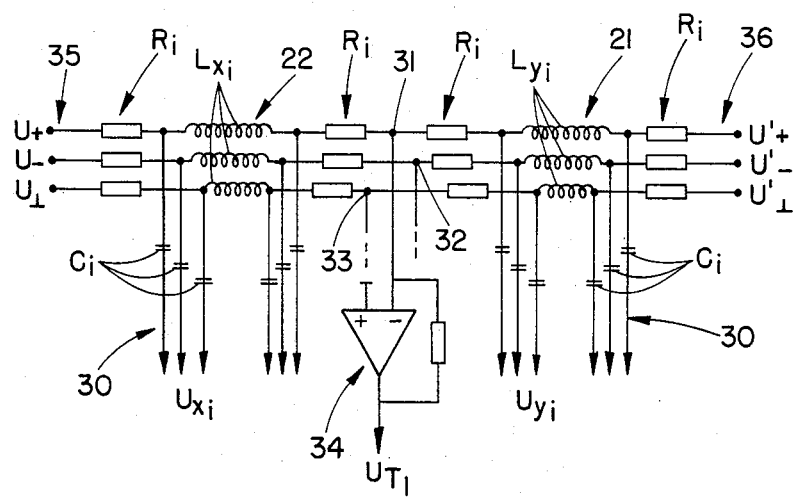
FIG. 3 illustrates an arrangement for direct current monitoring.

An example of the foregoing is more fully described in FIG. 3. Herein, the two trifilar coils 21 and 22 are indicated with the individual windings $L_{xi}$, which are presently connected in series with resistors $R_i$ and energized at different voltage potentials. In order to encouple the superimposed measurement signals, capacitors $C_i$ are present connected into the input lines 30 for the measuring voltage $U_{xi}$.

In an $L_{xi}$, $L_{yi}$ series circuit, the resistors $R_i$ and the endpoint potential voltages U, U' are so correlated with each other, that at a respective midpoint pick-off 31 or 32 and 33, the sum of currents is equal to zero, such that the current/voltage converting operational amplifier 34 will not generate a signal in the undisturbed condition of the associated coil wire system $L_{xi}$, $L_{yi}$, in essence, $U_{ti} = 0$. In the drawing there is merely illustrated the operational amplifier 34 for $L_{x1}$, $L_{y1}$. Corresponding operational amplifiers (not shown in the drawing) are associated with the pick-off points 32 and 33 for the two remaining channels.

The three are presently connected at their one end 35 to reversed polarities $U_+$, $U_-$, $U_\perp$, in effect, the ends 36 are connected to $U_+'$, $U_-'$, $U_\perp'$ such that, in the event of a short-circuit between the wires $L_{xi}$ of the coil 22, or between the wires $L_{yi}$ of the coil 21, in one of the coils which is involved in the short-circuit, the current flow reverses and the sum of currents at the respective pick-off point will differ from zero, so as to emit a test signal $U_{ti} \neq 0$. The current will similarly be shirted at the pick-off points 31 to 33 when one of the channels is disrupted or when two channels are short-circuited.

A monitoring unit (not shown) monitors the outputs of the three operational amplifiers, and upon the occurrence of a malfunction in one of the channels, will actuate an indicator and, depending upon circumstances, a change-over or reversing arrangement for the steering system.

The DC monitoring system described herein is of a particularly simple structure, eliminating the need to generate comparative currents for the operational amplifiers 34. The circuits can also be correlated in another manner, in which the different junction currents can be compared with predetermined values and employed for the monitoring.

What is claimed is:

1. A device for guiding a trackless vehicle along a path defined by a guide cable disposed in a road surface, said guide cable carrying a current thereby generating an electromagnetic field in the space surrounding the guide cable, said device comprising:

detector means for detecting the direction and magnitude of the magnetic field, said detecting means including first and second detecting coils, each of said detecting coils being parallel wound with at least three mutually insulated resistor wires, said wires being wound physically and electrically in parallel on at least one core disposed on said vehicle to form at least three substantially indentical sensing coil circuits;

said first detecting coil being disposed on said vehicle for detecting a horizontal magnetic field component and said second detecting coil being disposed on said vehicle for detecting a vertical magnetic field component, said first and second detecting coils generating, from the magnetic field components, first and second alternating signals the ratio of which is representative of the lateral displacement between the guide cable and the detector means; and short circuit monitoring means having the coil wires of the respective coils connected to direct current means superimposing direct currents on the currents induced by the magnetic-field-component to enable short circuits between the at least three insulated resistor wires to be detected by changes in the direct current flows through the at least three insulated resistor wires from the direct current flows normally expected when no short circuits are present, to enable a particular faulty sensing coil circuit to be detected.

2. Device as claimed in claim 1, wherein the core is E-shaped.

3. Device as claimed in claim 2, wherein said iron core is sized to facilitate the distance measurement at up to 30-times field variation.

4. Device as claimed in claim 1, further including means operatively connected to the coil wires of each of said first and second detecting means for detecting a malfunction of the detecting coil wires.

* * * * *